April 19, 1966 J. J. CARROLL 3,247,323

GATING CIRCUIT FOR A TIME DIVISION MULTIPLEX SWITCHING SYSTEM

Filed Oct. 11, 1961

INVENTOR.
JOHN J. CARROLL

BY C. A. Gulbrandsen
Atty.

United States Patent Office 3,247,323
Patented Apr. 19, 1966

3,247,323
GATING CIRCUIT FOR A TIME DIVISION MULTIPLEX SWITCHING SYSTEM

John J. Carroll, Elmhurst, Ill., assignor to Automatic Electric Laboratories, Inc., Northlake, Ill., a corporation of Delaware Filed Oct. 11, 1961, Ser. No. 144,358
8 Claims. (Cl. 179—15)

This invention relates to high speed information handling systems, and more particularly, it relates to high speed gating circuits for transferring signals between pairs of communication terminals in said systems.

In the majority of the present day high speed information handling systems, time sharing or time division multiplexing is used, and the information to be transferred from one communication terminal to another is transferred over a common transmission link. Each pair of terminals in communication is assigned a cyclically recurring discrete time slot during which time this information may be transferred. A transmission gate associated with each of these communication terminals connects them to the common transmission link during the time slot assigned, and disconnects them during the time interval between their recurring time slots.

While this mode of operation is particularly desirable because of the large number of communication terminals which may share a single, common transmission link, the requirements placed on the transmission gates are quite severe since the performance of the system is dependent upon their operation. Several of the more important required characteristics of the transmission gates are: they must be able to assume as nearly as possible a zero impedance to current flow in either direction while in their "on" state, and as nearly as possible an infinite impedance to current flow in either direction while in their "off" state; they must also be able to switch from their zero impedance state to their infinite impedance state, and back again, in rapid response; and the gate control signals must be electrically isolated from the signal paths.

Transmission gates employing a single bilateral transistor or two bilateral transistors, either in series or in parallel, have been designed which very nearly meet all of the above mentioned requirements. The single bilateral transistor gate has been found to be undesirable because of the introduction of D.C. components into the signal circuit by the control circuit. The two bilateral transistor gate substantially eliminates this undesirable result, however, it has also been found unsatisfactory for various reasons. For example, in the case of the bilateral transistors connected in parallel, it has been found that while there is very nearly complete isolation of the control signals from the signal paths, the impedance presented by the transmission gate in its "off" state is much lower because of the two transistors being in parallel. The transmission gate employing the two bilateral transistors in series, has good isolation and presents a high impedance when in its "off" state, however, its impedance while in its "on" state is also high and is undesirable for this reason. In addition to these undesirable characteristics as well as several others not mentioned, the fact that two bilateral transistors are required rather than one increases the cost of this type of gate appreciably since bilateral transistors are relatively expensive.

Transmission gates have also been designed employing a diode bridge type arrangement. While this type of transmission gate has several desirable characteristics, the large amount of driving power required for operation of the gate is a definite disadvantage in its use.

It is, therefore, the principal object of this invention to provide a new and improved high speed gating circuit for use in high speed information handling systems.

It is a further object of this invention to provide a new and improved gating circuit having a high impedance to current flow in either direction when in its "off" state.

It is a still further object of this invention to provide a new and improved gating circuit having a low impedance to current flow in either direction when in its "on" state.

It is a still further object of this invention to provide a new and improved high speed gating circuit which may be switched from its high impedance state to its low impedance state, and back again, in a very short time.

It is a still further object of this invention to provide a new and improved gating circuit which requires a very small amount of driving power.

It is a still further object of this invention to provide a new and improved gating circuit wherein the control signals are electrically isolated from the signal paths.

These and other objects of this invention are attained in one specific illustrative embodiment wherein each of a plurality of transmission gates is comprised of a transistor-diode bridge arrangement including as its principal components a single bilateral transistor and two diodes.

According to this invention, one electrode, either the collector or emitter electrode, since the roles of the transistor electrodes are interchangeable depending upon the polarity of the signals applied, is connected to the communication terminal and the other of the two electrodes is connected to the common transmission link. The two diodes connected back-to-back in a series relation to pass current in opposite directions, are also connected to the communication terminal and the common transmission link respectively. A source of bias potential is connected to the junction between the two diodes and to the base electrode of the transistor, and normally maintains both the diodes and the transistor nonconductive. A source of control pulses is also connected to the junction between the two diodes and to the base electrode of the transistor for rendering both the diodes and the transistor conductive, thus activating the transmission gate.

In accordance with one aspect of this invention, the impedance presented to current flowing in either direction by a transmission gate of this design when in its "off" state is much larger than heretofore obtainable by the transmission gates of the prior art. The impedance is approximately equivalent to the impedance of the transistor itself while nonconductive since the diodes that are in parallel with it have a very large impedance in comparison to the transistor.

In accordance with another aspect of the invention, the impedance presented by a transmission gate of this design when in its "on" state is also very low. The impedance of the transistor while in saturation is relatively slight as is the impedance of the diodes.

In accordance with still another aspect of the invention, a capacitor connected between the junction connecting the two diodes and a source of control pulses aids the deactivation, or the switching time, of the transmission gate by forcing the transistor into cut-off when the control pulse is removed. The capacitor retains nearly all of its initial charge during the application of the control pulse. When the control pulse is removed this charge across the capacitor immediately forces the transistor into cut-offs.

In accordance with still another aspect of the invention, the control pulses applied to the base electrode of the transistor and to the diodes is of such polarity that the current flows through the base electrode and divides equally between its two other electrodes and through the two diodes, respectively, rendering the diodes conductive and driving the transistor into saturation. The transmission gate is therefore switched to its low impedance state and signals may pass freely through the gate to the common transmission link.

These and other objects and features of this invention may be more clearly understood by reference to the following drawings taken in connection with the description which follows. In these drawings.

Figure 1:
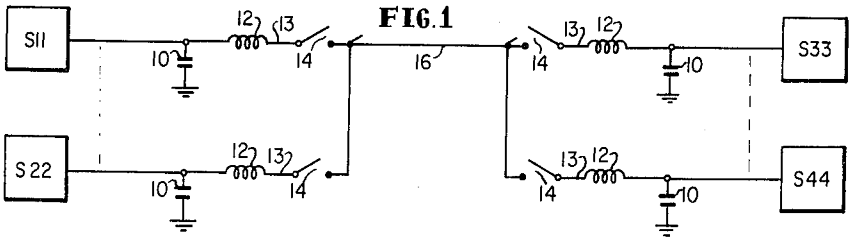
FIG. 1 shows a resonant transfer system in detail sufficient to explain the basic principles of such a system.

Referring now to FIG. 1, the components of a communication system employing the principle of resonant transfer for transferring information between a plurality of stations connected to a common transmission link are shown in sufficient detail to explain the basic principle of operation. Generally, each of the stations in a communication system of this type includes a low pass filter network with shunt capacitance, an inductor, and a high-speed transmission gate for connecting the station to the common transmission link.

In FIG. 1, each of the stations is shown comprising a capacitance 10 which represents the shunt capacitance of the low pass filter network, an inductor 12, and a transmission gate 14, represented by a pair of contacts, connecting the station to the common transmission link 16. These components as well as any stray capacitance in the transmission gates and the common transmission link form a resonant circuit for transferring information between the stations, either directly or over the common transmission link.

The transmission gates 14 are normally open and prevent any signals from flowing over the common transmission link. Any signals originating at a station during the time that the transmission gates 14 are open pass through the low pass filter network and are stored in the shunt capacitance 10. Upon closing the transmission gates 14 at a calling station and a called station the signals are transferred through the transmission gate 14 either directly to or over the common transmission link 16 to the transmission gate 14 at the called station and are stored in the shunt capacitance 10 of the low pass filter network at the called station. A charged capacitance connected to a similar uncharged capacitance in this manner normally results in a sharing of the charge between them.

As it was previously stated, in present day high speed information handling systems each pair of stations in communication is generally assigned a cyclically recurring discrete time slot during which time information may be transferred. In a communication system employing a resonant transfer of signals, one-half cycle of the resonant frequency of the resonant circuit is determined to be precisely equal to the length of a time slot, thus in one-half cycle of the resonant frequency all of the charge stored on the capacitance 10 at a calling station is transferred to the capacitance 10 at a called station. Timing of the transmission gates 14 is such that the gates 14 are opened, that is, switched to their high impedance state, at the end of the time slot which corresponds to the instant current reversal would occur thus any return flow is prevented. The performance of the system as may be noted, is therefore dependent upon the ability of the transmission gates to prevent signal leakage to the common transmission link during the interval between time slots and to prevent attenuation of the signals transferred as well as the other characteristics previously mentioned.

Figure 2:
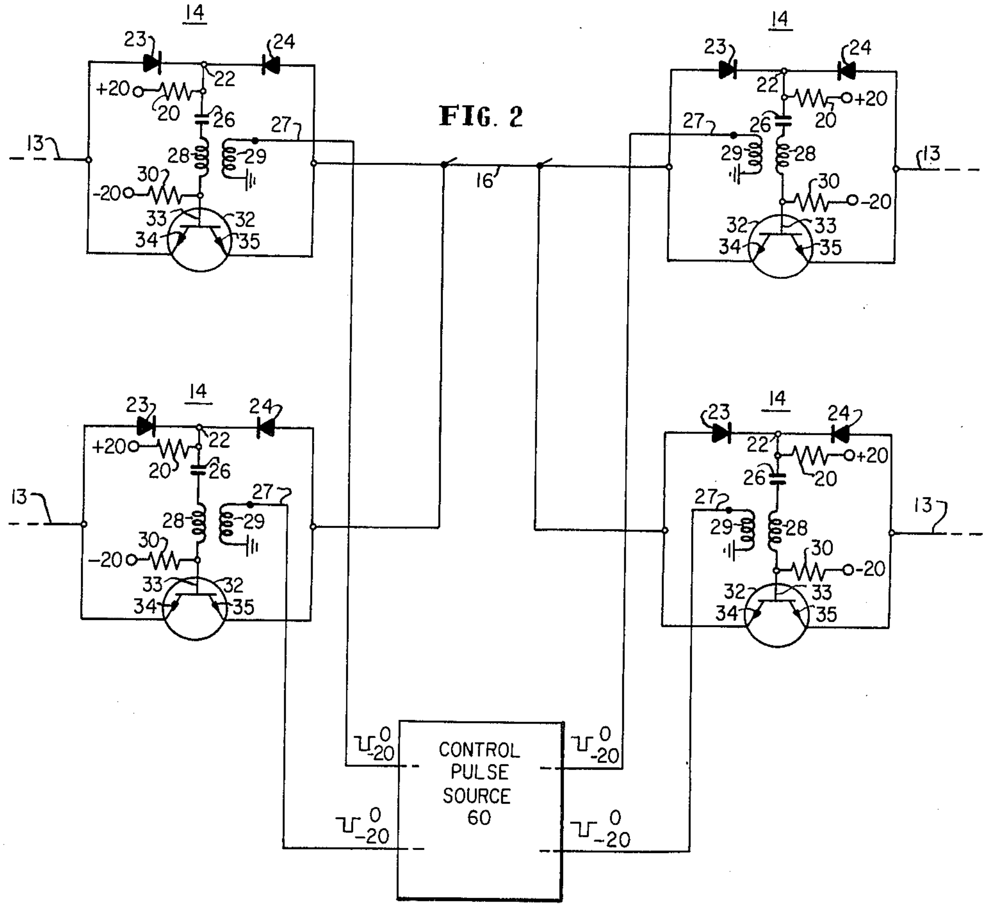
FIG. 2 shows the gating circuits according to this invention.

One specific illustrative embodiment of a transmission gate in accordance with this invention, is shown in FIG. 2 wherein a portion of the system shown in FIG. 1 is again shown. The components shown in FIG. 2 which correspond to the components shown in FIG. 1 are labeled the same as in FIG. 1. Each of the transmission gates 14 comprises a bilateral transistor 32 having a base electrode 33, an electrode 34 connected to the conductor 13, and an electrode 35 connected to the common transmission link 16. The electrodes 34 and 35 have not been designated as either a collector electrode or an emitter electrode for, as it is well known in the case of bilateral transistors, either may assume the designation of collector or emitter electrode depending upon the polarity of the signals applied thereto. A pair of diodes 23 and 24 are connected back-to-back in a series relation to conduct current in opposite directions and are connected, respectively, to the electrodes 34 and 35 of the transistor 32 to form a transistor-diode bridge circuit. A source of bias potential is connected, respectively, through the resistor 30 to the base electrode 33 of the transistor 32 and through the resistor 20 to the junction 22 between the two diodes 23 and 24. A step up transformer having a primary winding 29 and a secondary winding 28 has one output terminal of the secondary winding 28 connected through a capacitance 26 to the junction 22 between the diodes 23 and 24 and its other output terminal connected to the base electrode 33 of the transistor 32. Its primary winding has its two input terminals connected to an output conductor 27 of a source of control pulses 60 and to ground, respectively.

The source of control pulses 60 may be of any type known in the art which is capable of assigning a particular time slot to a calling and called station and repetitively supplying control pulses to the transmission gates associated with these stations.

The transistor 32 and the diodes 23 and 24 are normally held non-conductive by means of the bias potentials connected through the resistors 30 and 20, respectively. The capacitor 26 has its upper plate (as shown) charged positively while its lower plate is charged negative and aids in maintaining this bias potential as well as providing isolation between the two sources of bias potential. Under these conditions the transmission gates 14 are in their "off" states and present high impedance to current flow in either direction.

The impedance presented by the transmission gates 14 while in their "off" states is equal to the impedance of the parallel combination of the reverse bias impedance of the transistor 32 and that of the diodes 23 and 24 while in their non-conductive states. The impedance, therefore, will be essentially equivalent to the impedance of the transistor 32 since the impedance of the diodes 23 and 24 is considerably greater than that of the transistor 32.

A control pulse appearing on an output conductor 27 of the source of control pulses 60 will cause a transmission gate 14 to be switched from its high impedance state to its low impedance state. These control pulses flow through the primary winding 29 and appear stepped up in the secondary winding 28 of the transformer of a transmission gate 14. The control signals induced in a secondary winding 28 are of opposite polarity than the bias potential thus the voltages across a secondary winding 28 and a capacitor 26 appear as two batteries in series having opposite polarity. Since the voltage across a secondary winding 28 is larger and of positive polarity with respect to its lower terminals (as shown) the control signals induced in the secondary winding 28 will flow into the base electrode 33 of a transistor 32 and will divide equally between the electrodes 34 and 35, continue through the diodes 23 and 24, to the negative terminal of the secondary winding 28. The electrode junctions of the transistor 32 are now heavily forward biased and the transistor 32 is in saturation. A transmission gate 14 having its transistor 32 in saturation is in its "on" state and represents very little impedance to current flow in either direction. Any signals stored, for example, in a capacitance 10 at a station having its transmission gate in its "on" state will flow through the electrodes 34 and 35 of a transistor 32 to the common transmission link 16.

During the time a control signal is applied and the signal flow is as described, it has been found that the charge on a capacitor 26 remains essentially the same as the charge initially established across a capacitor 26 due to the bias potentials applied to a bilateral transistor 32 and the diodes 23 and 24. This charge which remains on the capacitor 26 improves the operation of the transmission gates 14 considerably in that a much faster switching action is possible. When the control pulse is removed the voltage across the secondary winding 28 disappears and the potential across the capacitor 26 will cause current to flow through the diodes 23 and 24 to the electrodes 34 and 35 of the transistor 32 and immediately force the transistor 32 into cut-off. The cut-off time of the transistor 32, and thus the switching time of the transmission gates 14 in switching from its "on" state to its "off" state, is therefore much more rapid than heretofore attained since the transistor 32 is forced into cut-off rather than depending upon the storage time of the transistor, as is normally the case.

Assume now for the purpose of explanation that the transmission gates 14 shown in FIG. 2 are the transmission gates 14 associated with the stations S11–S44 of FIG. 1, and that the Station S11 is calling the station S33. The output signals originating at the station S11 flow through the low pass filter (not shown) and are stored in the filters shunt capacitance 10 since the transmission gates 14 are normally in their "off," or high, impedance states preventing signal flow, in either direction, through the transmission gates 14.

During the time slot assigned to the stations S11 and S33, a control pulse will be applied to the output conductors 27 of the source of control pulses 60 connected to transmission gates 14 of each of the stations S11 and S33. The control pulse appears stepped up across the secondary windings 28 and forward biases the transistor 32 and the diodes 23 and 24 at each of the stations S11 and S33, in the manner previously described, and the transmission gates 14 are thereby switched to their "on," or low impedance states. The signals stored in the capacitance 10 flow through the inductor 12, conductor 13 and the electrodes 34 and 35 of the transistor 32 at the station S11, to the common transmission link 16, through the electrodes 34 and 35 of the transistor 32, the conductor 13, the inductor 12, and stored in the capacitance 10 at the called station S33.

At the end of the time slot assigned to the stations S11 and S33 the control pulses are removed from the conductors 27 connected to these stations. The capacitor 26 at the stations S11 and S33 are charged, as previously described, and drive the transistors 32 into cut-off thereby switching the transmission gates 14 to their "off," or high impedance states.

The above-described arrangements are merely illustrative of the invention and it is to be understood that numerous modifications may be resorted to without departing from the true spirit and scope of the invention as defined in the appended claims.

What is claimed is:

1. A gating circuit for transferring signals from a first point to a second point comprising: a bilateral transistor having a first electrode connected to said first point, a second electrode connected to said second point, and a base electrode; a first and a second rectifier connected in back-to-back series relation to pass current in opposite directions, and connected to said first and said second points, respectively, said bilateral transistor and said first and second rectifiers normally in their high impedance states preventing the transfer of said signals; and control means having a first output connection connected to said base electrode and a second output connection connected to the junction connecting said first and said second rectifiers for switching said bilateral transistor and said first and second rectifiers to their low impedance states to allow said signals to be transferred from said first point to said second point.

2. A gating circuit for transferring signals from a first point to a second point comprising: a bilateral transistor having a first electrode connected to said first point, a second electrode connected to said second point, and a base electrode; a first and a second rectifier connected in back-to-back series relation to pass current in opposite directions, and connected to said first and said second points, respectively, said bilateral transistor and said first and second rectifiers normally in their high impedance states to prevent the transfer of said signals; capacitance means having a first and a second terminal, said first terminal connected to the junction connecting said first and second rectifiers; a transformer having a primary winding and a secondary winding, said secondary winding having a first and a second output terminal connected to said second terminal on said capacitance means and said base electrode, respectively; and means connected to said primary winding for supplying control pulses thereto for switching said bilateral transistor and said first and second rectifiers to their low impedance states to allow said signals to be transferred from said first point to said second point.

3. A gating circuit for transferring signals from a first point to a second point comprising: a bilateral transistor having a first electrode connected to said first point, a second electrode connected to said second point, and a base electrode; a first and a second rectifier connected in back-to-back series relation to pass current in opposite directions, and connected to said first and said second points, respectively; means for applying a bias potential to said bilateral transistor and to said first and second rectifiers to bias said bilateral transistor and said first and second rectifiers non-conductive to present high impedance to current flow in either direction to prevent the transfer of said signals; a transformer having primary winding and a secondary winding, said secondary winding having a first and a second output terminal connected to said junction connecting said first and second rectifiers and said base electrode respectively; means included in said connection between said first output terminal of said secondary winding and said junction connecting said first and second rectifiers for isolating the bias potential applied to said bilateral transistor and to said first and second rectifiers; and means connected to said primary winding for supplying control pulses thereto for rendering said bilateral transistor and said first and second rectifiers conductive to thereby switch them to a low impedance state to allow said signals to be transferred from said first point to said second point.

4. A gating circuit, as claimed in claim 3, further comprising means included in the connection between said first output terminal of said secondary winding and said junction connecting said first and second rectifiers for reducing the time required for said bilateral transistor to switch from its conductive to its non-conductive state.

5. A gating circuit, as claimed in claim 4, wherein said means for isolating the bias potential applied to said bilateral transistor and to said first and second rectifiers and said means for reducing the time required for said bilateral transistor to switch from its conductive to its non-conductive state comprises a capacitor.

6. A time division multiplex switching system comprising a common transmission link, a plurality of communication terminals, a plurality of gating means each individually associated with one of said communication terminals, said gating means each comprising a bilateral transistor having a first electrode connected to said communication terminals, a second electrode connected to said common transmission link, and a base electrode, a first and a second rectifier connected in back-to-back series relation to pass current in opposite directions, and connected to said communication terminal and to said common transmission link, respectively, capacitance means, a transformer having a primary winding and a secondary winding, said secondary winding having a first output terminal connected through said capacitance means to the junction connecting said first and said second rectifiers and a second output terminal connected to said base electrode, and means for selectively applying control signals to said primary winding for switching said bilateral transistor and said first and second rectifiers from a high impedance state to a low impedance state to control the transfer of signals from one of said communication terminals to another of said communication terminals over said common transmission link.

7. A gating circuit for transferring signals from a first point to a second point comprising: a bilateral transistor having a first electrode connected to said first point, a second electrode connected to said second point, and a base electrode; rectifier means connected to said first and second points, said rectifier means and said bilateral transistor normally in their high impedance states preventing the transfer of said signals; control means connected to said rectifier means and to said base electrode for switching said bilateral transistor and said rectifier means to their low impedance states to allow said signals to be transferred from said first point to said second point; and means interposed in said connection between said rectifier means and said control means for reducing the time required for said transistor to switch from its low impedance state to its high impedance state.

8. A time division multiplex switching system including a common transmission link, a plurality of communication terminals, and a plurality of gating means each individually associated with one of said communication terminals, said gating means each comprising: a bilateral transistor having a first electrode connected to said communication terminal, a second electrode connected to said common transmission link, and a base electrode; rectifier means connected to said communication terminal and to said common transmission link; a transformer having a secondary winding connected to said rectifier means and to said base electrode, and a primary winding; means for selectively applying control pulses to said primary winding for switching said transistor and said rectifier means from a high impedance state to a low impedance state to control the transfer of signals from one of said communications terminals to another over said common transmission link; and means interposed between said rectifier means and said secondary winding for reducing the time required for said transistor to switch from its low impedance state to its high impedance state.

References Cited by the Examiner

UNITED STATES PATENTS

| | | | |
|---|---|---|---|
| 2,816,238 | 12/1957 | Elliott | 307—88.5 |
| 2,927,967 | 3/1960 | Edson | 179—15 |

DAVID G. REDINBAUGH, *Primary Examiner.*

R. L. GRIFFIN, *Assistant Examiner.*